United States Patent

[11] 3,612,437

[72] Inventors Franze E. Allebach;
Lester H. Courtney, both of Fayetteville, Ark.
[21] Appl. No. 841,331
[22] Filed July 14, 1969
[45] Patented Oct. 12, 1971
[73] Assignee Shakespeare of Arkansas, Inc.
Fayetteville, Ark.

[54] FREE SPOOL MECHANISM
3 Claims, 5 Drawing Figs.

[52] U.S. Cl. .................................................. 242/216,
192/20, 192/83, 192/114, 242/220
[51] Int. Cl. ........................................................ A01k 89/00
[50] Field of Search............................................. 242/84.54,
84.45, 84.46, 84.44; 192/20, 83, 114

[56] References Cited
UNITED STATES PATENTS
1,399,536  12/1921  Adams .......................... 242/84.54
2,417,732  3/1947   Bland et al. .................... 242/84.54 X
3,104,850  9/1963   Wood ............................ 242/84.54 X
3,489,366  1/1970   Rankin, Jr. ..................... 242/84.54
FOREIGN PATENTS
734,278    7/1932   France ........................... 242/84.44

Primary Examiner—Billy S. Taylor
Attorney—Hamilton, Cook, Renner & Kenner

ABSTRACT: A free spool mechanism for a fishing reel. The free spool mechanism employs a clutch by which a driving connection between two rotatable members in the drive train operatively joining a crank and line spool can be selectively disengaged and automatically reengaged upon rotation of the crank. The clutch has opposed, interfitting clutch elements, one mounted on a pinion and the opposed clutch element mounted on said line spool. The pinion is mounted to be not only rotatable but also axially translatable. A shift means selectively translates the pinion to disengage the clutch elements, the pinion being retained in its translated position by gripping means when the clutch elements are separated. Irrespective of whether the clutch elements are engaged or disengaged, the pinion continuously meshes with a drive gear operatively connected to revolve in response to rotation of the crank. The teeth on the pinion and drive gear are of the helical variety and the helical teeth on the pinion are selected to present a hand such that the driving connection between the teeth on the pinion and the drive gear occurs only on the sides of the pinion teeth distal with respect to the clutch element mounted on the pinion when the crank is rotated to retrieve line. As such, reengagement of the clutch elements is occasioned solely by a component of the pressure applied by the teeth on the drive gear against the teeth on the pinion.

INVENTORS
FRANZ E. ALLEBACH
LESTER H. COURTNEY
BY Hamilton, Cook,
Renner & Kenner
ATTORNEYS

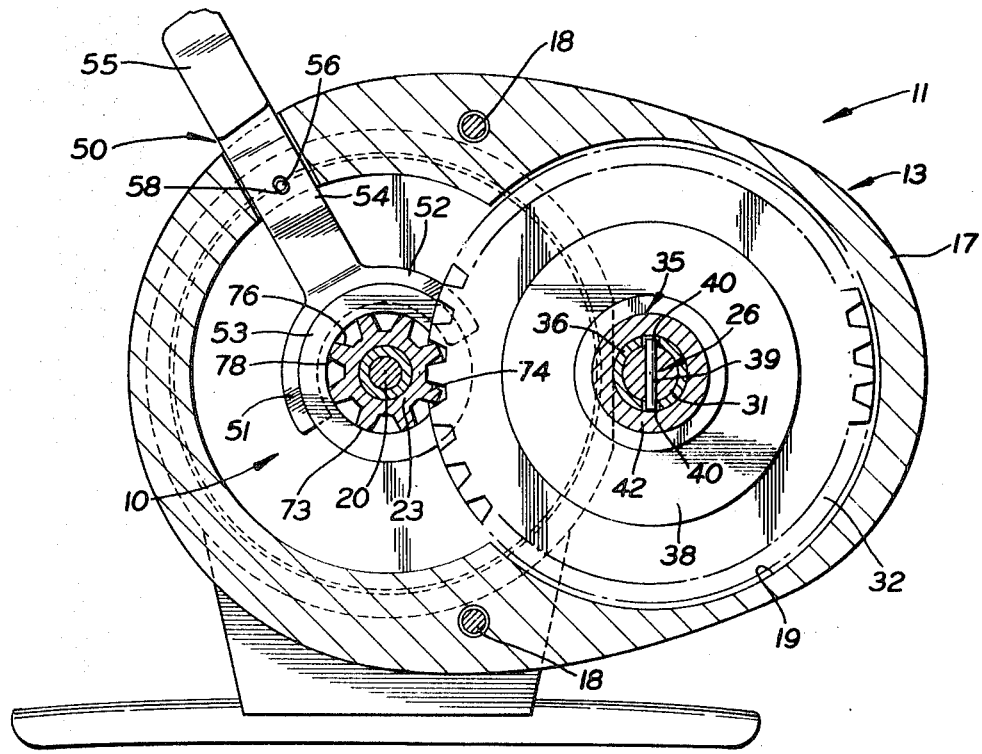
FIG. 3
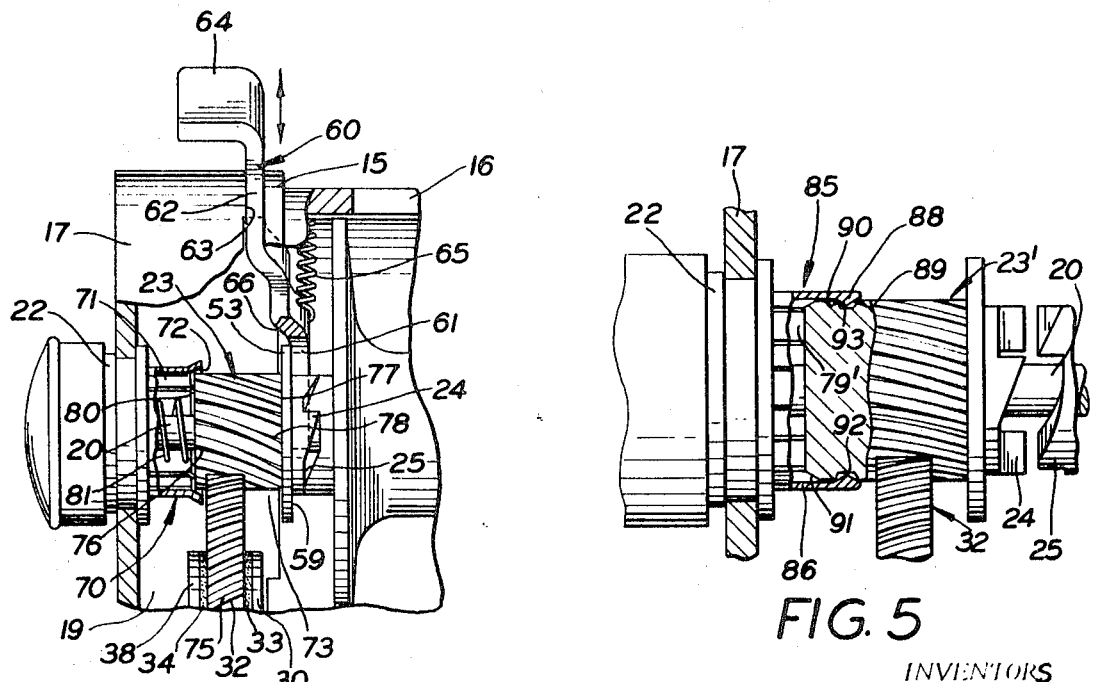
FIG. 4
FIG. 5
INVENTORS
FRANZ E. ALLEBACH
LESTER H. COURTNEY
BY Hamilton, Cook,
Renner & Kenner
ATTORNEYS 3,612,437

FREE SPOOL MECHANISM

BACKGROUND OF THE INVENTION

The present invention relates to a free spool mechanism.

It was recognized at a very early stage in the development of bait-casting reels, and particularly multiplying reels, that there were many advantages to be obtained by permitting the spool to rotate independently not only with respect to the crank but also with respect to as much of the drive train between the crank and spool as possible. Absent this free spooling, the intertooth friction between meshing gear teeth in a complex drive train will itself tend to retard rotation of the line spool during the cast, and this undesirable effect is often augmented by the improper application of heavy grease to the gear teeth. But an even greater hindrance to the achievement of controlled rotation by the line spool during a cast is the result of inertia—both static and dynamic.

The principle of bait casting is that the lure, the motion of which is imparted by the action of the rod, pulls the line from the reel, causing the spool on which the line is wound to revolve. The spool must start to revolve suddenly from a dead stop at the beginning of the cast, must pay out line in ratio to the pull of the lure as it travels through the air and must be made to cease revolving as soon as the lure reaches its destination.

As such, the greater the mass that must be put into motion by the cast, the greater the resistance that is offered against the flight of the lure. Similarly, once this mass is put into motion, the more difficult it is to slow the movement thereof in coordination with the flight of the lure at the end of the cast. The use of a free spool mechanism permits reduction of the mass that must be put in motion and then stopped.

Historically, free spool arrangements required manual actuation of means to disengage the spool from the drive train prior the cast and then additional manual actuation upon completion of the cast to reengage the spool with the drive train before rotating the crank. As the free spool concept was further developed, various mechanisms were devised for automatically reengaging the spool with the drive train by the initial movement of the crank to retrieve the line.

Heretofore, one of the simplest arrangements employed opposed clutch elements selectively to interconnect the line spool with a pinion in the drive train operatively connecting the crank to the line spool. One of the elements was mounted on the pinion and the other on the line spool. The pinion was rotatable to drive the line spool and axially translatable to engage and disengage the elements of the clutch. The prior known arrangement employed a spring means continuously to bias the pinion in a direction to maintain the clutch elements engaged. Specifically, the spring was interposed between the frame of the reel and a clutch-operating lever pivotally mounted on the frame of the reel and engaging the pinion to effect reciprocating translation thereof in response to movement of the clutch-operating lever. A slide plate, movable between first and second positions, was cooperatively connected to the clutch-operating lever so that movement of the slide plate from the first to the second position by a fisherman's finger selectively disengaged the clutch elements and retained them disengaged until a toothlike cam, or cams, operative in response to rotation of the crank to retrieve line, contacted the slide plate and moved it from the second position back to the first position, at which time the spring effected a reengagement of the clutch.

While effective, it is readily apparent that such a concept requires a multiplicity of components, thus increasing the potential necessity for undue maintenance and repair.

SUMMARY OF THE INVENTION

It is, therefore, a primary object of the present invention to provide a novel free spool mechanism utilizing a clutch means that is automatically reengaged by the initial retrieving movement of the crank and yet is exceedingly uncomplicated so that it can be incorporated in a fishing reel with a minimal number of parts.

It is another object of the present invention to provide a free spool mechanism, as above, in which the means for automatically reengaging the clutch means will not block manual disengagement thereof, is relatively inexpensive to manufacture and maintain, and will provide a long life even under arduous use.

These and other objects, together with the advantages thereof over existing and prior art forms which will become apparent from the following specification, are accomplished by means hereinafter described and claimed.

In general, a reel embodying the concept of the present invention has a frame in which a line spool is rotatably mounted, as is a crank. A motion-transmitting means, including at least a pinion and a drive gear continuously meshing therewith, interconnects the crank and line spool so that rotation of the former results in rotation of the latter. The crank, motion-transmitting means and line spool comprise a drive train of multiple rotatable members.

A clutch means having interfitting first and second clutch elements interconnects the pinion with one of the rotatable members in the drive train other than the drive gear—generally the line spool; the first clutch element is mounted for movement with the pinion, and the second clutch element is mounted for rotation with the rotatable member of the drive train selectively interconnected to the pinion by the clutch means. The pinion is mounted in the reel frame to be not only rotatable for effecting rotation of the line spool but also axially translatable for selective engagement and disengagement of the clutch elements. An independent shift means is generally provided for the purpose of unidirectionally translating the pinion to disengage the clutch elements and provide free spooling; however, retrorotation of the crank may also be employed, if desired, to disengage the clutch elements.

A gripping means is provided to retain the pinion translated such that the clutch elements are disengaged.

The meshingly engaged pinion and drive gears are both provided with helical teeth—the helical teeth on the pinion presenting both distal and proximal sides with respect to that clutch element mounted thereon. The hand of the helical teeth on the pinion and drive gear is selected solely on the basis that the driving contact therebetween occurs on the distal side of the pinion teeth when the crank is rotated to retrieve line. In this way, the lateral translation of the pinion necessary to reengage the clutch elements is uniquely occasioned by a component of the pressure applied by the teeth on the drive gear against the meshing teeth on the pinion.

Although the driving contact between the drive gear and pinion is wholly sufficient to maintain the clutch elements engaged under dynamic conditions, it is most desirable to utilize a restraining means to maintain the clutch elements engaged under static conditions. The restraining means must not, however, be capable of itself releasing the pinion from the gripping means when the clutch elements have been selectively separated.

One preferred embodiment of the subject free spool mechanism, together with an alternative form of the gripping means, an alternative form of the shift means and a supplemental restraining means that is not formed integrally with the gripping means, are shown by way of example in the accompanying drawings without attempting to show all of the various forms and modifications in which the invention might be embodied; the invention being measured by the appended claims and not by the details of the specification.

DESCRIPTION OF THE DRAWINGS

FIG. 3 is a cross section taken substantially on line 3—3 of FIG. 1;

FIG. 4 is a view similar to FIG. 2 but depicting the components of the free spool mechanism positioned to provide a driving connection between the crank and line spool and further depicting an alternate form of shift mechanism and a supplemental restraining means; and, FIG. 5 is a view similar to a partial area of FIG. 2, further enlarged, and depicting an alternate form of gripping means, the components depicted being positioned as they would be for free spooling.

DESCRIPTION OF THE PREFERRED EMBODIMENTS

Figure 1:
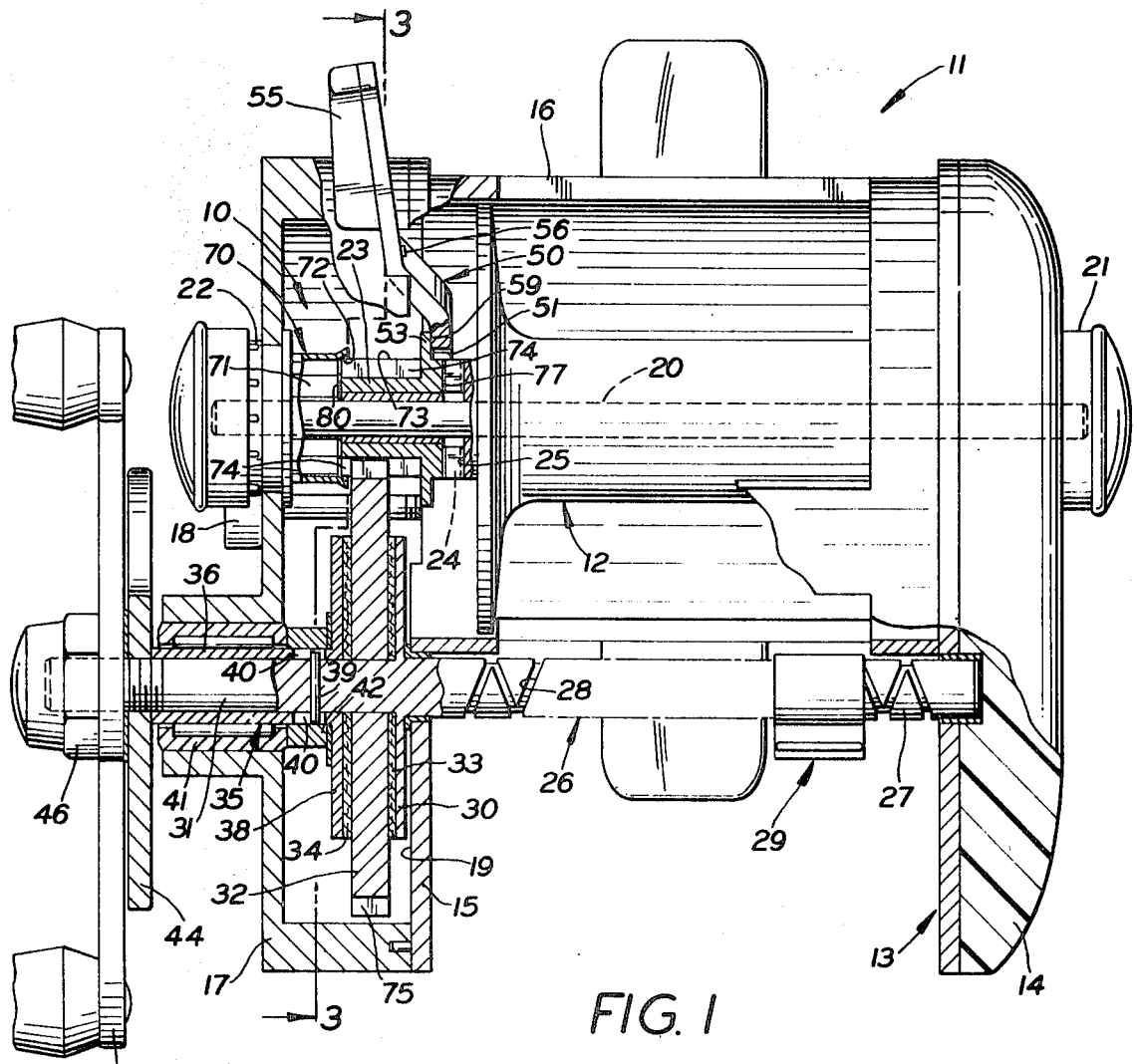
FIG. 1 is a top plan, partly broken away and partly in section, of a bait-casting reel incorporating a free spool mechanism embodying the concept of the present invention, the components of said free spool mechanism positioned to provide a driving connection between the crank and line spool.

Referring more particularly to the drawings, a free spool mechanism embodying the concept of the present invention is indicated generally by the numeral 10 and is incorporated in a reel 11 of the bait casting variety.

The reel 11 has a line spool 12 rotatably mounted in the reel frame 13, the frame 13 comprising a tail portion 14 rigidly joined in spaced relation to a head portion 15 by weblike pillars 16 that may be integrally formed therewith.

A head cap 17 is demountably secured to the head portion 15 of the reel frame 13, as by a plurality of screws 18. The head portion 15 and head cap 17 encompass an interior cavity serving as a gear chamber 19.

The line spool 12 is secured to a spool shaft 20 so as to be rotatable therewith, and the shaft 20 is supportingly journaled by the reel frame 13—one end in a bearing 21 mounted in the tail portion 14 and the other end in a bearing 22 mounted in the head cap 17.

A free spool pinion 23, discussed in greater detail below, is mounted on the spool shaft 20 within the gear chamber 19 and presents an axially directed clutch element 24 meshingly interengageable with a mating clutch element 25 anchored to the spool 12 and shaft 20. Although a variety of configurations may be employed as the clutch elements, the interfitting toothed serrations depicted will operate quite satisfactorily.

Laterally spaced from the line spool 12 and spool shaft 20 is a combination shaft 26, also journaled between the tail portion 14 and the head cap 17. Between the tail portion 14 and the head portion 15 of frame 13 the combination shaft 26 may present a traversing portion 27 provided with the customary crossover threads 28 to reciprocate a level wind 29.

Interiorly of the gear chamber 19, and adjacent the head portion 15, a drag disc 30 extends radially of the shaft 26 and is secured to be rotatable therewith. Axially outwardly of the drag disc 30 the combination shaft 26 presents a drive portion 31. An input drive gear 32 is supported on the drive portion 31 between two friction washers 33 and 34 so as to be both rotatable and axially slidable with respect to the drive portion 31.

A gland 35 in the form of a sleeve 36 with a radially extending foot flange 38 is also supported on the drive portion 31 of shaft 26 so as to be slidable axially thereof and yet be rotatable only therewith. As shown in FIGS. 1 and 3, a pin 39 extending diametrically of the drive portion 31 projects radially thereof and interfits within a pair of axially elongated apertures 40 in the sleeve 36 to effect this result.

The sleeve 36 may then be journaled through a bearing 41 mounted in the head cap 17, and a spacer ring 42 is received over the sleeve 36 between the foot flange 38 and the inner end of bearing 41.

The sleeve 36 extends axially outwardly of the head cap 17 for contact by an adjusting means in the form of a star wheel 44 threadably mounted on the drive portion 31 of shaft 26. Axially outwardly of the star wheel 44 the crank 45 is demountably secured to the drive portion 31 in the customary fashion for rotation therewith and is retained thereon by a decorative capnut 46.

It should be appreciated that by having the combination shaft 26 shiftable axially of the tail portion 14, head portion 15 and within the gland 35, rotation of the star wheel 44 against the end of sleeve 36 will compress the input drive gear 32 between the drag disc 30 and the foot flange 38. Variation of this compressive loading varies the frictional engagement between the washers 33 and 34 and the drive gear 32 embraced thereby for adjustment of the drag.

Turning now to the free spool mechanism 10, a shift means is provided selectively to disengage the clutch elements 24 and 25. As best shown in FIG. 3, the shift means may comprise a shift member 50 having a pair of spaced tynes 51 and 52 engageable with the axially inner face 59 (FIG. 2) of a lift flange 53 secured between the pinion 23 and clutch element 24. The tang portion 54 of the fork member 50 extends outwardly of the reel frame 13 and carries a knob 55.

The shift member 50 may be secured against radial displacement by a pin 56 extending from the head cap 17 through a slot 58 in the tang portion 54. The slot 58 must, however, have a sufficient radial extent so that pressure applied laterally of the knob 55, and parallel to the axis of the spool shaft 20, will cause the tynes 51 and 52 to engage the axially inner face 59 of the lift flange 53 and slide the pinion 23 axially along the spool shaft 20 to disengage the clutch elements 24 and 25 and thereby effect free spooling.

FIG. 4 depicts an alternative form of shift member 60 whereby free spooling may be effected by the application of a radial force. The shift member 60 has a forked camming portion 61 that is interengageable with the axially inner face 59 of the lift flange 53. The tang portion 62 of shift member 60 extends radially outwardly through a guide slot 63 in the head cap 17 and presents knob portion 64 exteriorly of the reel. A spring means 65 is preferably connected between the shift member 60 and the head cap 17 biasingly to urge the camming portion 61 radially out of contact with the lift flange 53. The application of radial pressure, as by the fisherman's thumb, to the knob portion 64 of shift member 60 overcomes the biasing action of spring 65 and moves the inclined cam surface 66 on the camming portion 61 against the axially inner face 59 of the lift flange 53 to slide the pinion 23 along the spool shaft 20 and thereby disengage the clutch elements 24 and 25 to effect free spooling.

Free spooling may also be effected by a third variation which eliminates the necessity of having a shift means other than an input drive gear 32 rotatable in response to rotation of handle 45. It should be appreciated that one may use a roller clutch bearing assembly for bearing 41 in order to provide an antireverse effect. However, one may employ a bearing 41 which permits rotation of combination shaft 26 in either direction. In that event, the application of a reverse rotation to handle 45 will itself translate the pinion 23 along spool shaft 20 to disengage the clutch elements 24 and 25.

Figure 2:
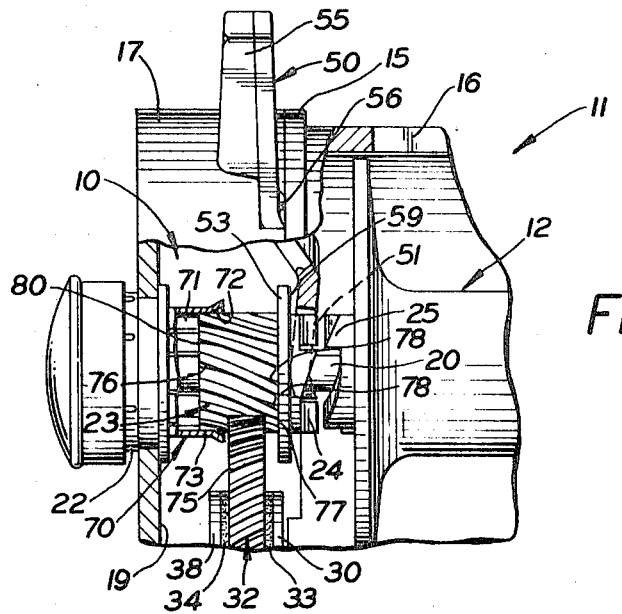
FIG. 2 is an enlarged partial area of FIG. 1 depicting the components of the free spool mechanism positioned for free spooling.

Irrespective of which shift means is employed to translate the pinion 23 and attached clutch element 24 for free spooling, a separate gripping means is provided to retain the pinion 23 and clutch element 24 so translated. As shown in FIGS. 1, 2 and 4, the gripping means may comprise a socket 70 carried in the head cap 17. The socket 70 presents a plurality of resilient fingers 71, each having a flared tip 72. When the clutch elements 24 and 25 are engaged, the pinion 23 turns freely of the fingers 71. However, as the shift means 50 or 60 translates the pinion 23 to disengage the clutch elements 24 and 25, the pinion 23 is guided into the socket 70 by the flared tips 72 on the ends of the fingers 71 and then retained in its displaced position by the frictional engagement of the fingers 71 with the tips 73 of the teeth 74 on the pinion 23.

According to the concept of the present invention, a driving connection is uniquely reestablished between clutch elements 24 and 25 by harnessing a component of the pressure applied by the teeth 75 on input drive gear 32 against the teeth 74 on pinion 23.

For economical reasons the drive train in a fishing reel generally employs spur gears which are, after all, the most common gears for transmitting power between parallel shafts. However, where, as in the reel art, there exists both a premium on space and a necessity for a wide disparity between the diameter of the pinion and the diameter of the drive gear in order to provide the desired retrieve ratio, spur gears do not provide the smoothest action. It must be appreciated that the retrieve ratio is the number of revolutions imparted to the line spool in response to a single revolution of the crank. Although the retrieve ratio may vary from maker to maker and be further varied for the particular type fishing with which the reel is to be used, a ratio of between 3½:1 and 4½:1 is desirable for most bait-casting reels.

Because spur gears do not afford the smoothest action, some premium quality reels have heretofore employed helical gears to assure smoother action. Because of the angle at which the teeth on helical gears mesh, more than one tooth of each gear is always in mesh, and this condition permits far smoother action than possible with spur gears where the relative sizes of the meshing gears and the drive train of a typical bait-casting reel increases the tendency toward single tooth contact. However, even when helical gears were used, the prior art has employed complicated camming arrangements to release blocking mechanisms which, in turn, permitted spring means to urge the pinion and clutch elements into engagement.

According to the concept of the present invention one component of the tangential pressure between helical teeth on the spool pinion 23 and the drive gear 32 applies a lateral thrust against the pinion 23 sufficient to release the pinion 23 from the gripping engagement of socket 70 and thereby reengage the clutch elements 24 and 25 when the crank 45 is rotated to retrieve line.

In order to accomplish this result, the hand of the helical teeth on the pinion 23 and gear 32 must be selected so that the driving contact between the helical teeth 74 on the pinion 23 and the helical teeth 75 on the drive gear 32 occurs on that side 76 of the pinion teeth 74 facing away from the clutch elements 24 and 25. That is, with respect to the clutch element 24 mounted on the axially inner end 77 of the pinion 23, the driving contact between teeth 74 and 75 occurs on the distal side 76 of the pinion teeth 74 and not the proximal side 78.

It has been found that even a modest helix angle will provide the thrust necessary automatically to shift the clutch elements into, and maintain them in, engagement. Because of the wide range of operative helix angles this allows, one may select the particular helix angle so as to give the most propitious results for his reel construction—consideration being given both to the amount of thrust desired to shift the clutch elements into, and maintain them in, engagement and the amount of thrust loading imparted to the spool shaft bearing 21.

By employing one component of the force applied by the helical teeth 75 on the drive gear 32 to the teeth 74 on pinion 23 to free the pinion 23 from the socket 70 and thereby reengage the clutch elements 24 and 25, it will be appreciated that full driving engagement between the clutch elements is a result of a dynamic interaction between the drive gear 32 and pinion 23. In the static condition a restraining means is desired to maintain the clutch elements in engagement, but, such restraining means can well comprise, for example, the flared tips 72 on the ends of the fingers 71 if, as shown in FIG. 1, they are juxtaposed to the periphery of the axially outer face 80 of the pinion gear 23 when the clutch elements 24 and 25 are engaged. It must be appreciated that, while juxtaposed, the flared tips 72 may be incrementally spaced from the outer face 80 of the pinion when the clutch elements 24 and 25 are fully engaged inasmuch as the interaction of the driving gear 32 and pinion 23 is wholly sufficient to maintain the clutch elements engaged under dynamic conditions the restraining means offered by tips 72 being necessary only under static conditions. Moreover, were the tips 72 contiguous with the pinion gear 23 while the latter is rotating, the rotational contact of the teeth 74 with the tips 72 could create excessive noise during line retrieval. As such, any frictional resistance encountered during dynamic conditions as a result of prior art modes of maintaining clutch engagement is obviated.

Nevertheless, for those who wish, a very light spring 81 may encircle the spool shaft 20 between the pinion 23 and the bearing 22 merely to retain the clutch elements 24 and 25 statically engaged as shown in FIG. 4. However, it must be emphasized that in no event may the strength of spring 81 exceed the restraining force applied by the fingers 71 of socket 70 against the pinion 23 to maintain the clutch elements 24 and 25 disengaged for free spooling.

An alternative form of the gripping means is represented by the socket 85 depicted in FIG. 5. Socket 85 also presents a plurality of resilient fingers 86, each of which presents a radially inwardly directed detent 88 with conically flared faces 89 and 90 directed axially inwardly and outwardly respectively, with respect to the reel 11. A chamfer 91 at the peripheral edge of the axially outer face 79' of the pinion 23' cooperates with the conically flared face 89 on each finger 86 to maintain static engagement of the clutch elements 24 and 25, if the face 89 and chamfer 91 are juxtaposed but here too preferably spaced incrementally for the reasons previously noted—when the clutch elements are engaged, and to permit facile insertion of the pinion 23' into socket 85 when the pinion 23' is translated to disengage the clutch elements. An annular groove 92 spaced axially inwardly of the chamfer 91 receives the detents 88 to retain the clutch elements disengaged for free spooling.

The outwardly directed conical face 90 of each detent 88 cooperatively engages with the conically tapered wall 93 of groove 91. The generally mating inclination of the face 90 and wall 93 permits facile translation of the pinion 23' out of socket 85 in response to rotation of the crank 45.

In order to provide the necessarily continuous contact between pinion 23 and drive gear 32 and at the same time assure the necessary cooperation between the pinion 23 and the gripping sockets 70 or 85, the axial dimension of pinion 23 must be carefully selected.

It should now be apparent that a free spool mechanism embodying the concept of the present invention provides automatic reestablishment of the driving connection between the crank and line spool upon rotation of the crank to retrieve line by employment of only a minimal number of parts beyond those required in a fishing reel not provided with free spooling and otherwise accomplishes the objects of the invention.

We claim:

1. A free spool mechanism for a fishing reel having a frame, a line spool and a crank rotatably mounted in the frame, motion-transmitting means interconnecting the crank and line spool, the crank, motion-transmitting means and line spool comprising a drive train of multiple rotatable members, said free spool mechanism comprising, at least a pinion and a drive gear continuously meshing with said pinion included within said motion-transmitting means, said pinion having an axially inner end and an axially outer wall, clutch means selectively interconnecting the pinion with one of the rotatable members in said drive train other than said drive gear, said clutch means having interfitting first and second clutch elements, said first clutch element mounted on the axially inner end of said pinion for rotation therewith, said second clutch element mounted for rotation with the rotatable member of the drive train selectively interconnected to said pinion by the clutch means, said pinion and first clutch element being axially translatable for selective engagement and disengagement of said clutch elements, shift means to effect unidirectional translation of said pinion and first clutch element for disengaging said clutch elements, resilient gripping finger means on the reel frame to retain said pinion and first clutch element when the clutch elements are disengaged, helical teeth on said pinion and drive gear, said helical teeth on the pinion presenting proximal and distal sides with respect to the clutch element mounted to rotate with said pinion, the hand of said helical teeth being such that driving contact therebetween occurs on the distal side of said pinion teeth when the crank is rotated to retrieve line in order that a release from said gripping means and a translation of said pinion and first clutch element to reengage said clutch elements is occasioned by a component of the pressure applied by the teeth on said drive gear against the teeth on said pinion and a flared tip portion on said finger means, said flared tip portion being juxtaposed to the axially outer wall of said pinion when said clutch elements are engaged whereby restrainingly to maintain said clutch elements substantially engaged when said pinion is exteriorly of said gripping finger means and in a static condition.

2. A free spool mechanism, as set forth in claim 1, in which detents are provided on the radially inner side of said finger means and a peripheral groove is provided in said pinion, said detents engaging said peripheral groove when said clutch elements are disengaged.

3. A free spool mechanism, as set forth in claim 2, in which said detents have axially inwardly and axially outwardly directed conical faces, and in which the pinion has a chamfer at the periphery of said outer wall, said annular groove being spaced axially of said chamfer, and said detents being juxtaposed to said chamfer when said clutch elements are engaged.